(12) United States Patent
Fujita

(10) Patent No.: US 6,540,350 B2
(45) Date of Patent: Apr. 1, 2003

(54) LENS HOLDING MECHANISM FOR SPECTACLES

(75) Inventor: Hakaru Fujita, Tokyo (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 09/856,123

(22) PCT Filed: Apr. 20, 2001

(86) PCT No.: PCT/JP01/03402

§ 371 (c)(1),
(2), (4) Date: Jun. 1, 2001

(87) PCT Pub. No.: WO01/81983

PCT Pub. Date: Nov. 1, 2001

(65) Prior Publication Data

US 2002/0135732 A1 Sep. 26, 2002

(30) Foreign Application Priority Data

Apr. 25, 2000 (JP) ........................... 2000-124025

(51) Int. Cl.[7] ................................. G02C 1/02
(52) U.S. Cl. ....................... 351/110; 351/124
(58) Field of Search ................. 351/110, 103, 351/106, 111, 83, 86, 91, 92, 90, 41, 124, 140

(56) References Cited

U.S. PATENT DOCUMENTS 5,847,800 A 12/1998 Tachibana

FOREIGN PATENT DOCUMENTS

| JP | 7-19723 U | 4/1995 |
|---|---|---|
| JP | U 7-32620 | 6/1995 |
| JP | A 7-333563 | 12/1995 |
| JP | A 9-33861 | 2/1997 |
| JP | 3043006 U | 11/1997 |
| JP | A 9-325301 | 12/1997 |
| JP | A 10-2280000 | 8/1998 |
| TW | 371721 | 10/1999 |

Primary Examiner—Hung Xuan Dang
(74) Attorney, Agent, or Firm—Oliff & Berridge, PLC

(57) ABSTRACT

Rimless spectacles are provided which are easily fabricated and wherewith breadth of effective field of view, durability, aesthetic appearance, and light weight, etc., can be easily realized. Rimless spectacles are provided wherein cutouts are provided in the edges of spectacle lenses and attachment members are pushed into place in those cutouts and attached. The cutouts have widths that are either substantially constant or gradually narrow from the edge of the lens toward the center thereof, with ridges or grooves substantially parallel to the front and back surfaces of the spectacle lenses formed in the inner circumferential wall parts thereof. The attachment members have grooves or ridges formed therein that, when those attachment members are inserted into the cutouts from the edge sides of the spectacle lenses and pushed into place, mate with ridges or grooves in the cutouts where the attachment members abut on the inner circumferential wall parts of the cutouts. Thus these rimless spectacles are designed so that the attachment members are attached by being inserted from the edge sides of the spectacle lenses into the cutouts and pushed into place therein.

19 Claims, 14 Drawing Sheets

(a)   (b)

(c)   (d)

(a)

(b)

(c)

(d)

(a)  (b)

LENS HOLDING MECHANISM FOR SPECTACLES

TECHNICAL FIELD

This invention relates to rimless spectacles wherein cutouts or the like are provided at the edges of the spectacle lenses and attachment members are attached to those cutouts or the like without using rims.

BACKGROUND ART

Attention has been drawn in recent years to a rimless type of spectacles (rimless spectacles) because they offer such advantages as a wide field of view and light weight. There are several types of such rimless spectacles, namely a type wherewith the lower circumference of the lens is suspended by a nylon thread, a type wherewith holes for machine screws are made all the way through the lenses and the frame is secured by machine screws passed through these holes (called two-point or three-piece type), and the PinFeel type wherewith holes are made in the lens edge surfaces, but not all the way through, and pin-like projections in spectacle lens holding members are inserted therein and secured thereto.

Each of the types of rimless spectacles described above has its own respective features. However, these are not necessarily fully satisfactory in view of the machining costs involved and the fact that it is not necessarily easy to effect the design for lenses of various thicknesses and various materials which adequately realize wide effective field of view, durability, aesthetic attractiveness, and lighter weight, etc.

That being so, in recent years a type of rimless spectacles has been proposed that is designed so that cutouts or the like are provided at the edges of the spectacle lenses and attachment members are fit into those cutouts or the like and attached. Such types of rimless spectacles known to the prior art include those described in Japanese Patent No. 2997438 (Patent Application Laid-Open No. H10-228000/1998)) and Japanese Utility Model Registration No. 2602605 (Utility Model Application Laid-Open No. H7-32620).

The rimless spectacles described in Japanese Patent No. 2997438 (Patent Application Laid-Open No. H10-228000/1998) are based on a structure wherein cutouts (=fastening indentations 10) are provided in the lenses, channels (=insertion channels 20) are provided in attachment members (=end pieces 2) which fit into those cutouts, those channels (=insertion channels 20) are fit into the cutouts (=fastening indentations 10), and the wall portions on both sides of the channels abut on the front and back surfaces of the lenses and are thus secured (cf. FIG. 2 in the publication cited), whereupon the attachment members (=end pieces 2) are attached to the lenses.

What is characteristic in the rimless spectacles described in Japanese Utility Model Registration No. 2602605 (Utility Model Application Laid-Open No. H7-32620) is that the cutouts or channel-shaped portions provided in the lenses are made with a structure "wherein channels are provided of a shape having a wide part having a greater width than the opening part" so that the shapes of those cutouts or channel-shaped portions becomes a so-called end-broadening shape.

However, the rimless spectacles described in Japanese Patent No. 2997438 (Patent Application Laid-Open No. H10-228000/1998) suffer a shortcoming in that, insofar as the thickness of the lenses is subject to various changes according to the layout or lens power required by the wearer, the width of the channels (=insertion channels 20) in the attachment (=end pieces 2) must also be changed to match that lens thickness, which is troublesome. Furthermore, because the width of the attachment members (=end pieces 2) must always be made greater than the width of the cutouts in the lenses, they will always protrude from the front and back surfaces of the lenses, so that the field of view will be narrowed by that amount and aesthetic attractiveness impaired.

With the rimless spectacles described in Japanese Utility Model Registration No. 2602605 (Utility Model Application Laid-Open No. H7-32620), on the other hand, the attachment members must be fashioned into a shape wherewith they can be fitted into the "cutouts of end-broadening shape," wherefore the root portions thereof must of necessity be formed narrower than the end-broadened tip end portions. These root portions, however, must have sufficient strength to support the temples or the like that are joined to these attachment parts, wherefore the thickness needs to be greater than prescribed. Thereupon, the portions of end-broadening shape described earlier must be made even thicker than the thickness noted earlier, the lenses will have to be greatly cut out, the field of view will be narrowed, and the aesthetic appearance will be impaired, wherefore this leads to shortcomings. The machining involved in providing the cutouts of end-broadening shape is not easy either.

The structure of conventional rimless spectacles, including those described in the publications noted above, furthermore, is such that, as in conventional ordinary rimmed spectacles, end pieces are provided in the attachment parts, and hinges are provided in those end pieces so that the temples can be folded over. There are therefore limits on effecting lighter weight and improving the aesthetic appearance, etc.

An object of the present invention is to provide rimless spectacles that can be easily manufactured, wherewith a wide effective field of view, durability, aesthetic appearance, and lighter weight, etc., can easily be secured.

DISCLOSURE OF THE INVENTION

First means for resolving the problems described in the foregoing are rimless spectacles which are designed so that cutouts are provided in the edges of the spectacle lenses and attachment members are fit into those cutouts and attached without using rims, wherein the cutouts and attached without using rims, wherein the cutouts have widths that are either substantially constant or gradually narrow from the edges of the spectacle lenses toward the centers thereof, and have ridges, substantially parallel to the front and back surfaces of the spectacle lenses, formed in the inner circumferential walls thereof; the attachment members have grooves formed therein which, when the attachment members are inserted and pushed into place in the cutouts from the edge sides of the spectacle lenses, fit over the ridges in the cutouts where the attachment pieces abut on the inner circumferential walls of the cutouts; and the attachment members are attached to the cutouts by inserting the attachment members into the cutouts from the edge side of the spectacle lenses and pushing them into place so that the grooves in the attachment members fit over the ridges in the cutouts.

Second means are rimless spectacles which are designed so that cutouts are provided in the edges of the spectacle lenses and attachment members are fit into those cutouts and attached without using rims, wherein the cutouts have widths that are either substantially constant or gradually narrow from the edges of the spectacle lenses toward the centers thereof, and have grooves, substantially parallel to the front and back surfaces of the spectacle lenses, formed in the inner circumferential walls thereof; the attachment members have ridges formed therein which, when the attachment members are inserted and pushed into place in the cutouts from the edge sides of the spectacle lenses, fit into the grooves in the cutouts where the attachment pieces abut on the inner circumferential walls of the cutouts; and the attachment members are attached to the cutouts by inserting the attachment members into the cutouts from the edge side of the spectacle lenses and pushing them into place so that the ridges in the attachment members fit into the grooves in the cutouts.

Third means are rimless spectacles according to the first or second means wherein the widths of the attachment members are either substantially equal to or smaller than the widths of the cutouts.

Fourth means are rimless spectacles according to the first, second, or third means, wherein the cutouts constitute shapes such that at least one or other of the front and back surfaces of the spectacle lens is closed.

Fifth means are rimless spectacles comprising attachment structures for directly attaching attachment members to the edges of the spectacle lenses without using rims, in which hinge structures are provided in those attachment members so that the temples can be attached such that the temples can be folded over; wherein the attachment members do not have end pieces extending in directions substantially orthogonal to the front and back surfaces of the spectacle lenses, but hinge structures are formed directly at the sites where the attachment members are attached to the spectacle lenses and the temples are attached such that they can be folded over.

Based on the first to fourth means described above, when the attachment members are pushed into place in the cutouts and attached, they are secured by fitting grooves or ridges provided in the attachment members onto or into ridges or grooves provided in the cutouts, wherefore this securing is made strong. Compared to when the securing is done using screws or the like, moreover, the possibility of loosening after attachment can be made extremely slight. The securing contact surfaces (bonding surfaces) can be made large, wherefore strong attachment can be maintained. At the same time, the attachment members can be formed so that their size is more or less the same as the size of the cutouts. And, because the attachment members can be made flat with the lens faces, without protruding out from the lens faces, an enormous aesthetic advantage is gained, and it becomes extremely easy to wipe the lens surfaces. In addition, the attachment members can be made smaller in size, so the effective field of view can be made wider. Also, because the cutouts have widths that are the same or that become gradually smaller from the lens edges, machining is simplified and automation is easy. It is only necessary to effect a structure wherewith grooves or ridges provided in the attachment members can be pushed into place onto or into ridges or grooves provided in the cutouts, wherefore the lens thickness will have little influence, and there is no problem whatever with making the material thickness of the lens edge either thin or thick. That being so, Ophthalmic use of the spectacles is extremely easy. It is easy to make the attachment structure inconspicuous, and there is no sense of incongruity in terms of design. Due to the securing structure, it is possible to effect strong attachment using various kinds of materials, so those materials are not limited.

Based on the fifth means, moreover, hinges can be deployed directly on the attachment members and the temples attached directly so that they can be folded over without providing end pieces. Thus it is possible to effect new and extremely revolutionary designs never seen before.

11, 12 . . . spectacle lenses; 2 . . . bridge; 31, 32 . . . attachment members; 41, 42 . . . temples, 110 . . . cutout; 111 . . . ridge; 311 . . . groove; 313, 314 . . . hinge structures.

BEST MODE FOR CARRYING OUT THE INVENTION

Figure 1:
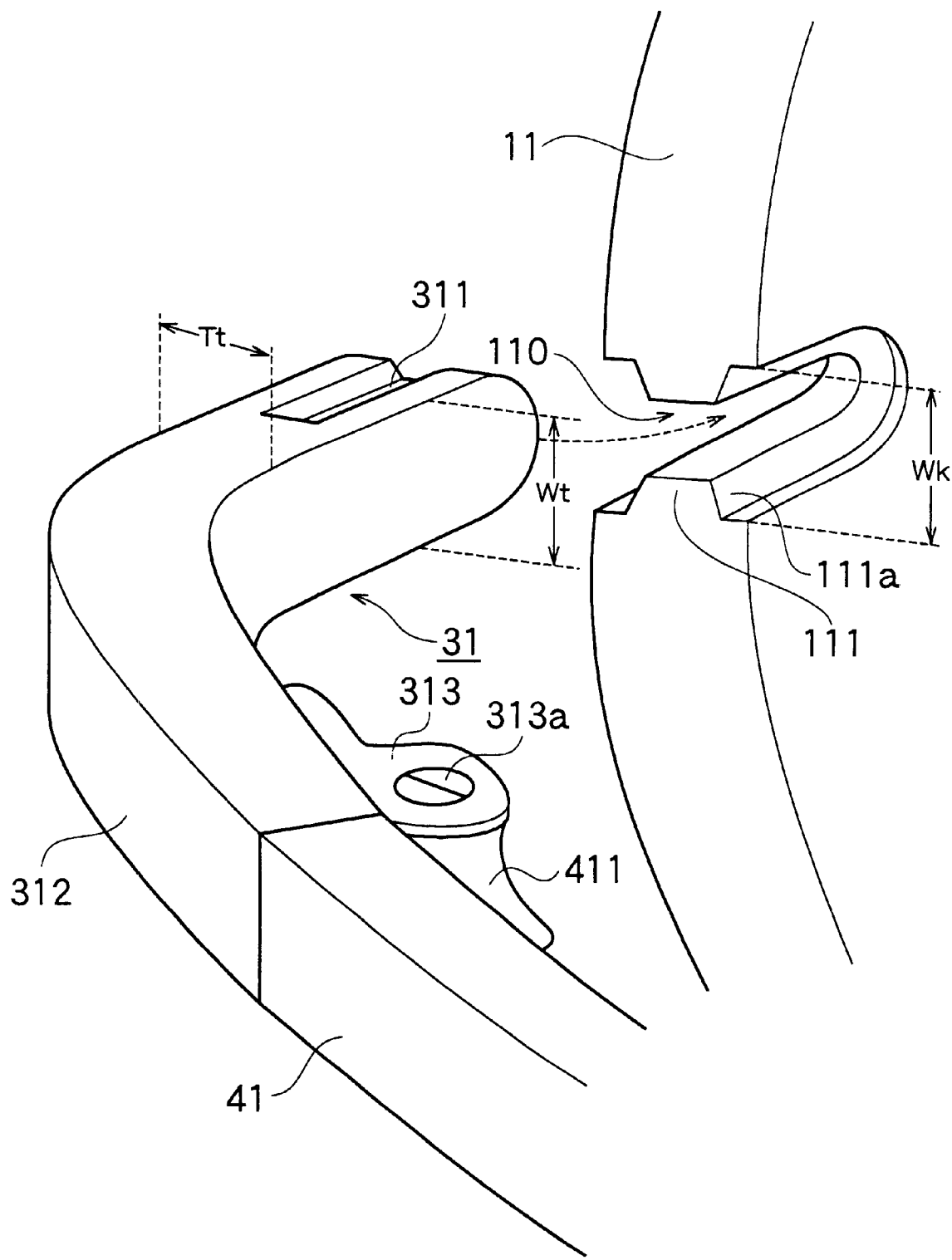
FIG. 1 is an explanatory diagram of the main parts of rimless spectacles relating to an embodiment of the present invention.
Figure 2:
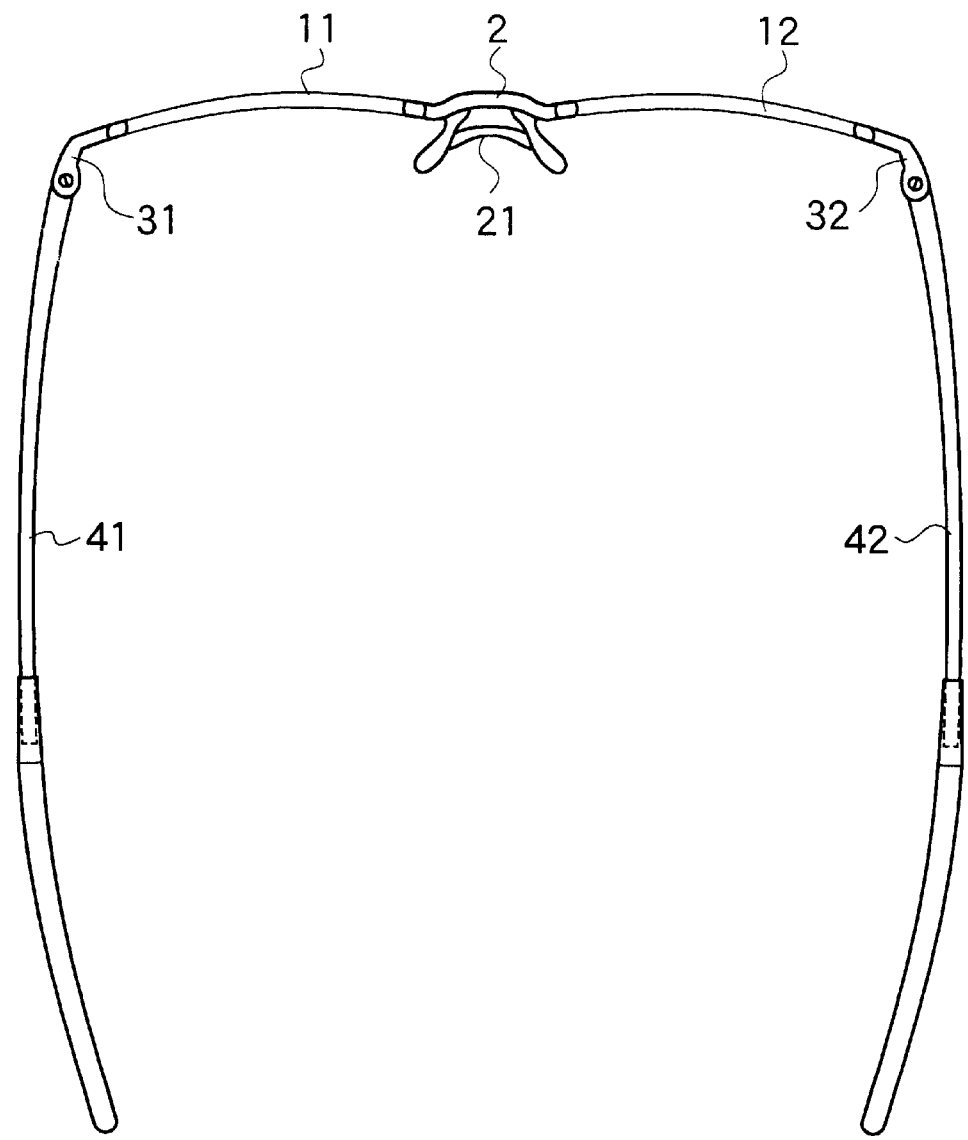
FIG. 2 is a plan of rimless spectacles relating to an embodiment of the present invention.
Figure 3:
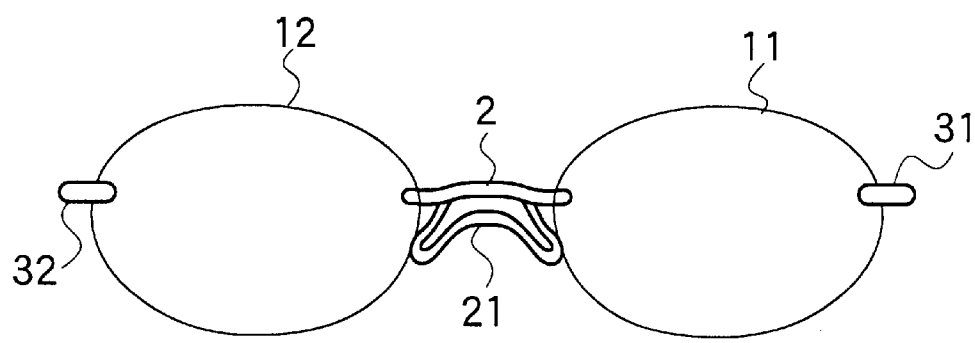
FIG. 3 is a front elevation of rimless spectacles relating to an embodiment of the present invention.
Figure 4:
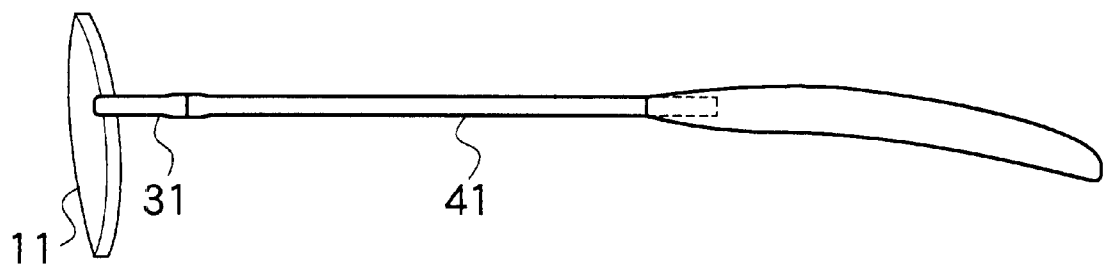
FIG. 4 is a side elevation of rimless spectacles relating to an embodiment of the present invention.
Figure 5:
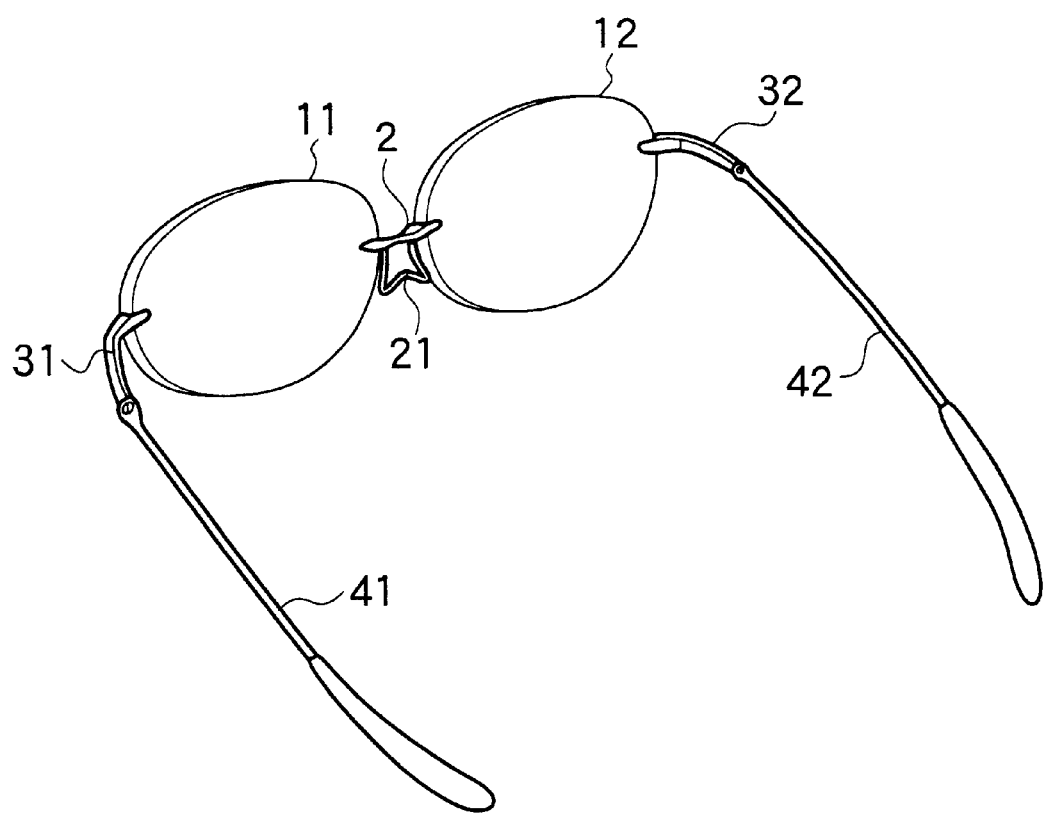
FIG. 5 is an oblique view of rimless spectacles relating to an embodiment of the present invention.

FIG. 1 is an explanatory diagram of the main parts of rimless spectacles relating to an embodiment of the present invention. FIG. 2 is a plan of rimless spectacles relating to an embodiment of the present invention. FIG. 3 is a front elevation of rimless spectacles relating to an embodiment of the present invention, FIG. 4 is a side elevation of rimless spectacles relating to an embodiment of the present invention, and FIG. 5 is a diagonal view of rimless spectacles relating to an embodiment of the present invention. Rimless spectacles relating to embodiments are now described with reference to these drawings.

In FIG. 2, symbols 11 and 12 indicate left and right spectacle lenses. These spectacle lenses 11 and 12 are joined by a bridge 2. To that bridge 2 is attached a nose piece 21. To the edges on the left and right extremities of the left and right lenses 11 and 12, respectively, are attached attachment members 31 and 32. To those attachment members 31 and 32 are respectively attached left and right temples 41 and 42.

As diagrammed in FIG. 1, a cutout 110 is formed in the edge at the left extremity of the spectacle lens 11, such that the front end of the attachment member 31 can be pushed into place in the cutout 110. This cutout 110 has a substantially constant width from the edge of the spectacle lens 11 toward the center thereof, and has a ridge 111 that is substantially parallel to the front and back surfaces of the spectacle lens 11 formed in the inner circumferential wall part thereof.

The attachment member 31 has a groove 311 formed therein, into which the ridge 111 of the cutout 110 fits, where the attachment member 31 abuts on the inner circumferential wall part of the cutout 110, when that attachment member 31 is inserted and pushed into place in the cutout 110 from the edge of the spectacle lens 11. That is, this attachment member 31 is designed so that, the attachment member 31 is attached to the cutout 110 by inserted the attachment member 31 into the cutout 110 from the edge of the spectacle lens 11, and pushing it into place so that the groove 311 in the attachment member 31 fits over the ridge 111 in the cutout 110. After the attachment member 31 is pushed into place in the cutout 110, it is secured with an adhesive or the like.

The attachment member 31 has an end piece 312 formed therein that bends toward the end thereof opposite the site of attachment to the spectacle lens 11 until it is in a direction substantially orthogonal to the front and back surfaces of the spectacle lens 11 on the face side. To this end piece 312 is secured a hinge member 313 that constitutes a hinge structure for attaching a temple 41 so that it can be freely folded over. This hinge member 313 is joined to a hinge member 411 secured to the temple 41 and fixed in place with a screw 313a. Thus the temple 41 is attached to the attachment member 31 such that it can be freely folded over.

Although not shown in the drawing, the attachment member 32 that is attached to the right spectacle lens 12 is attached in the same way as described above. The attachment to the spectacle lenses to the left and right of the bridge 2 is the same, wherefore no further explanation therefor is given here.

The width Wt of the attachment member 31 corresponding to the width Wk of the cutout 110 is formed so as to be substantially equal to the width Wk of the cutout 110 except where the groove 311 is formed. The side surface 111a of the ridge 111 in the cutout 110, in this embodiment, is made an inclined surface with an inclination of approximately 30° or so. The width Tt in the lens thickness direction in the cutout 110 of the attachment member 31 is made substantially the same as the thickness of the spectacle lens 11.

Figure 6:
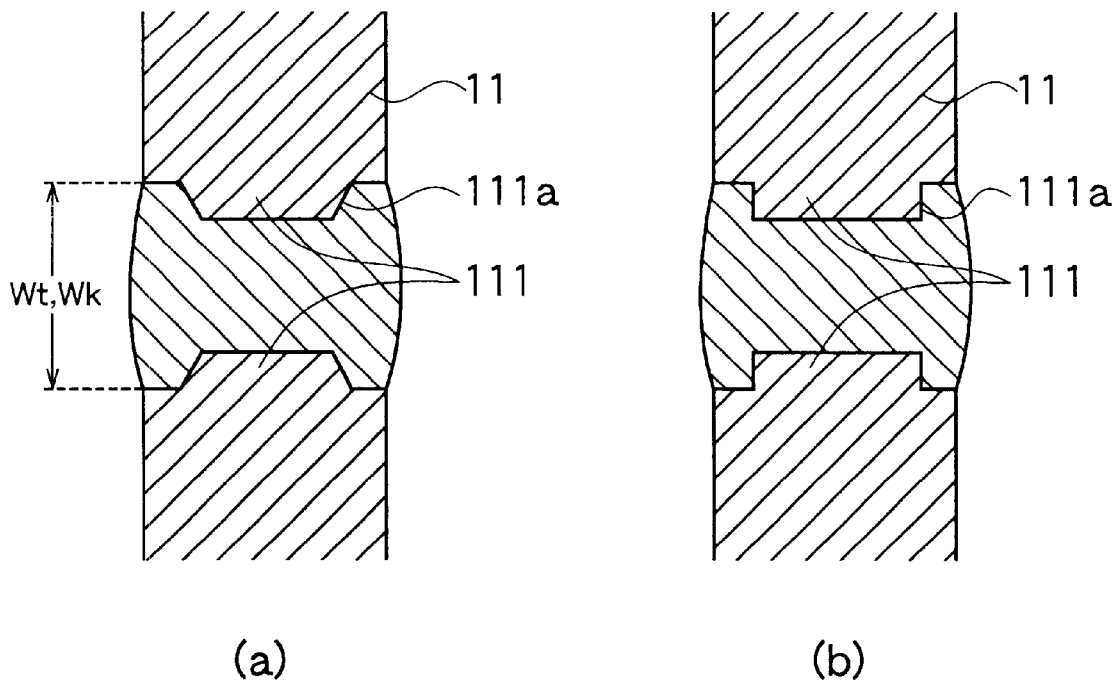
FIGS. 6a–6d provides cross-sectional views of portions wherein an attachment member 31 is pushed into place and secured in a cutout 110 in a spectacle lens 11.
Figure 6:
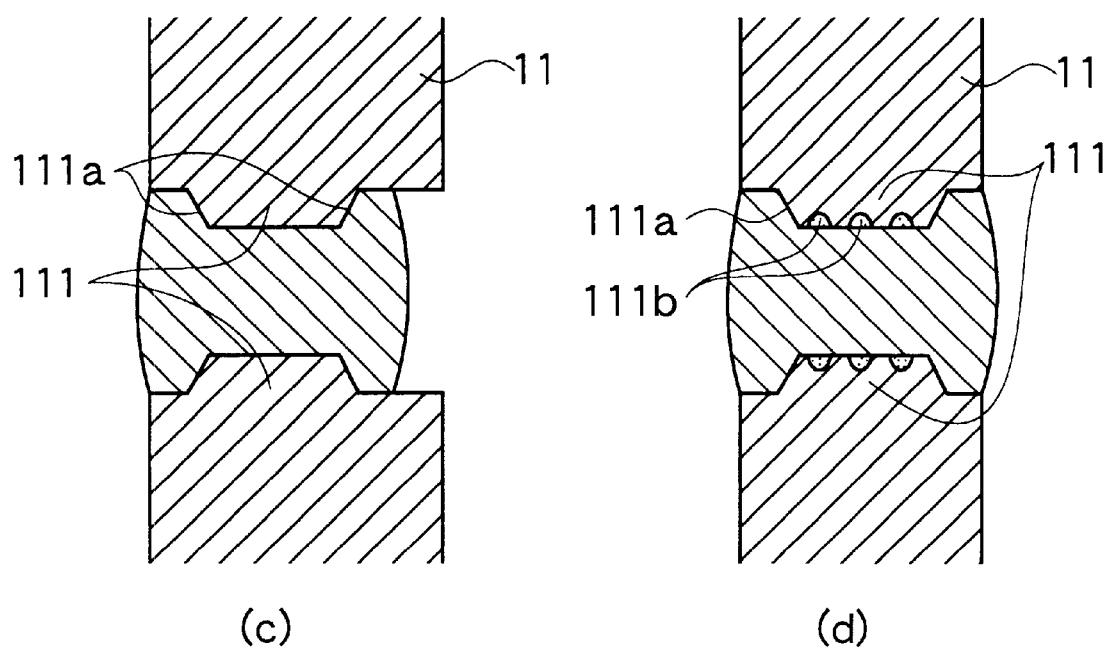

FIG. 6 provides cross-sectional views of portions wherein an attachment member 31 is pushed into place and secured in a cutout 110 in a spectacle lens 11. FIG. 6(a) represents the case of this embodiment. The cutting plane in this cross-sectional view is perpendicular to a straight line extending from the edge of the spectacle lens 11 to the center thereof. In the embodiment described in the foregoing, the side surface 111a of the ridge 111 in the cutout 110 is given an inclination, but it may also be made a perpendicular surface as diagrammed in FIG. 6(b).

In the embodiment described in the foregoing, moreover, the width Tt in the lens thickness direction of the attachment member 31 is made substantially the same as the thickness of the spectacle lens 11, but it may also be formed thinner than the thickness of the spectacle lens 11 as diagrammed in FIG. 6(c). In other words, if the width Wk of the cutout 110 and the width Wt of the attachment member 31 are made substantially equal, attachment can be effected using common attachment members even if the lens thickness changes, there ceases to be a need to fabricate attachment members for each lens, parts can be used in common, and extremely high utility can be realized.

The upper surface of the ridge 111 in the cutout 110 may be flat, or it may have one or more grooves 111b in it as diagrammed in FIG. 6(d). In the latter case, when securing is done using an adhesive, the grooves 111b act as adhesive reservoirs and a strong bond can be effected. In the embodiment described in the foregoing, furthermore, an example is given wherein one ridge 111 is provided, but a plurality thereof may be provided. The cross-sectional shapes of the ridge 111 in the cutout 110 and the groove 311 in the attachment member 31 may also be a simple V shape, a semi-cylindrical shape, or some other shape.

Figure 7:
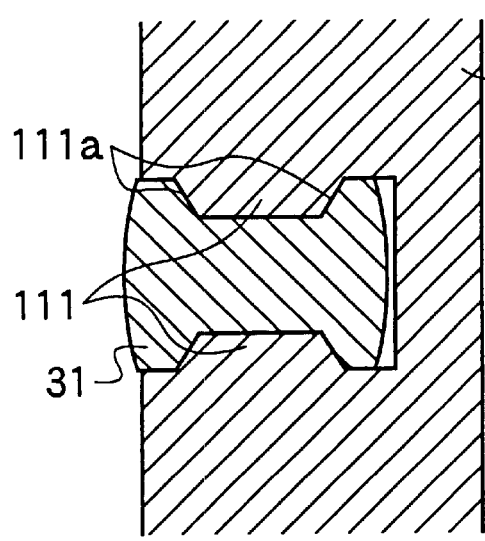
FIGS. 7a–7d provides views of other examples of cutouts.
Figure 7:
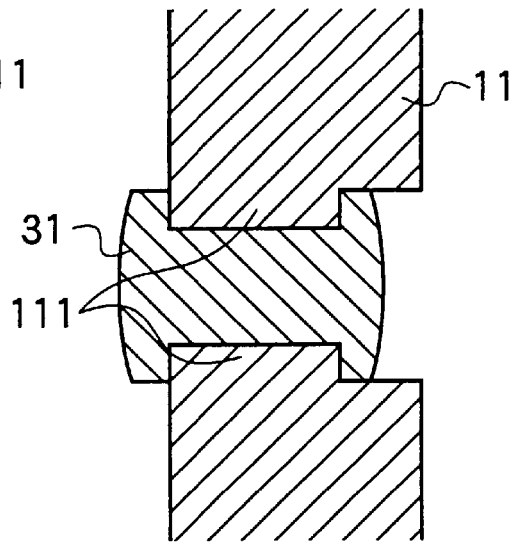
Figure 7:
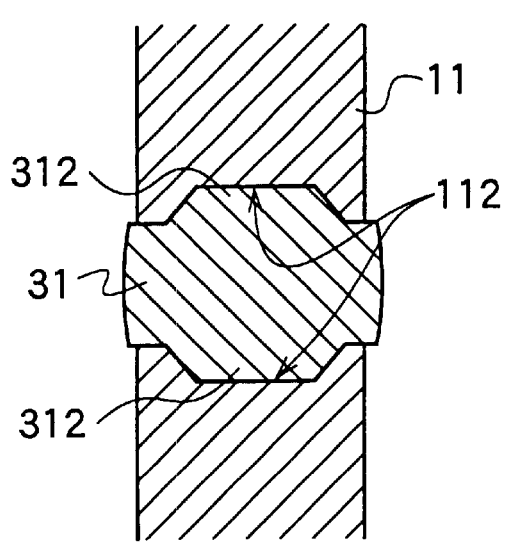
Figure 7:
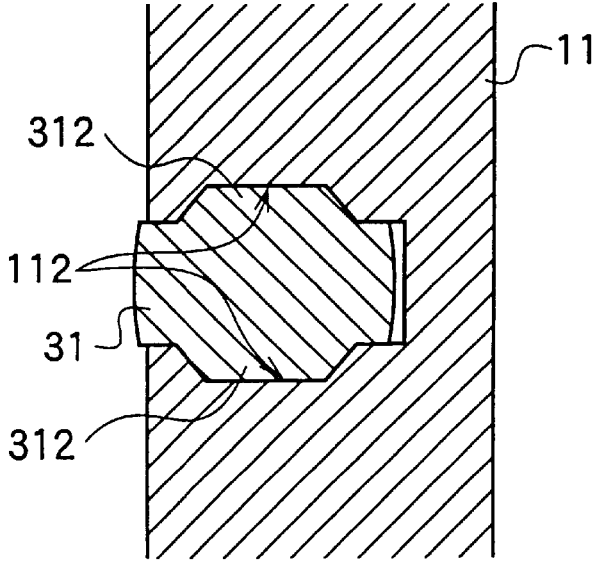

FIG. 7 provides diagrams of still other examples of cutouts 110. The cutout 110 may be made in a shape such that, as diagrammed in FIG. 7(a), at least either the front or the back surface of the spectacle lens 11 (the side toward the eye being diagrammed in the figure) is closed. If this is done, when the lens periphery is thick (as in the case of a lens of strong minus power), the portion removed in machining when forming the cutout can be diminished, making it possible to realize good results in terms of machinability, exterior appearance, and/or strength. Or, the ridge 111 may have one side surface 111a which is coincide with the front surface of the spectacle lens 11, as diagrammed in FIG. 7(b). Alternatively, as diagrammed in FIG. 7(c), a groove 112 may be provided in the cutout 11 instead of the ridge 111, and a ridge 312 in the attachment member 31 instead of the groove 311. In that case, the shape may be made so that at least either the front or the back surface of the spectacle lens 11 (the side toward the eye being diagrammed in the figure) is closed, as diagrammed in FIG. 7(d).

The spectacle lenses 11 and 12 are configured of a material such as glass or plastic. In cases where the lenses are made of synthetic resin, examples of such materials include diethylene glycol allyl carbonate or polycarbonates, and acrylic or polyurethane resins. Polyurethane type lenses are particularly desirable for the spectacle lens holding structures in this embodiment as they exhibit superior shock resistance and tensile strength, etc.

For the material for the attachment members 31 and 32 and the bridge 2 it is possible to use such resins as polyamides, polyimides, acetates, polyetherimides, polyether ether ketones, and polyphenyl sulfones, such metal materials as titanium or titanium alloys, iron-based alloys, nickel silver, Monel metal, high nickel, stainless steel or other nickel alloys, and bronze, beryllium-copper, or other copper alloy, or other materials.

Figure 8:
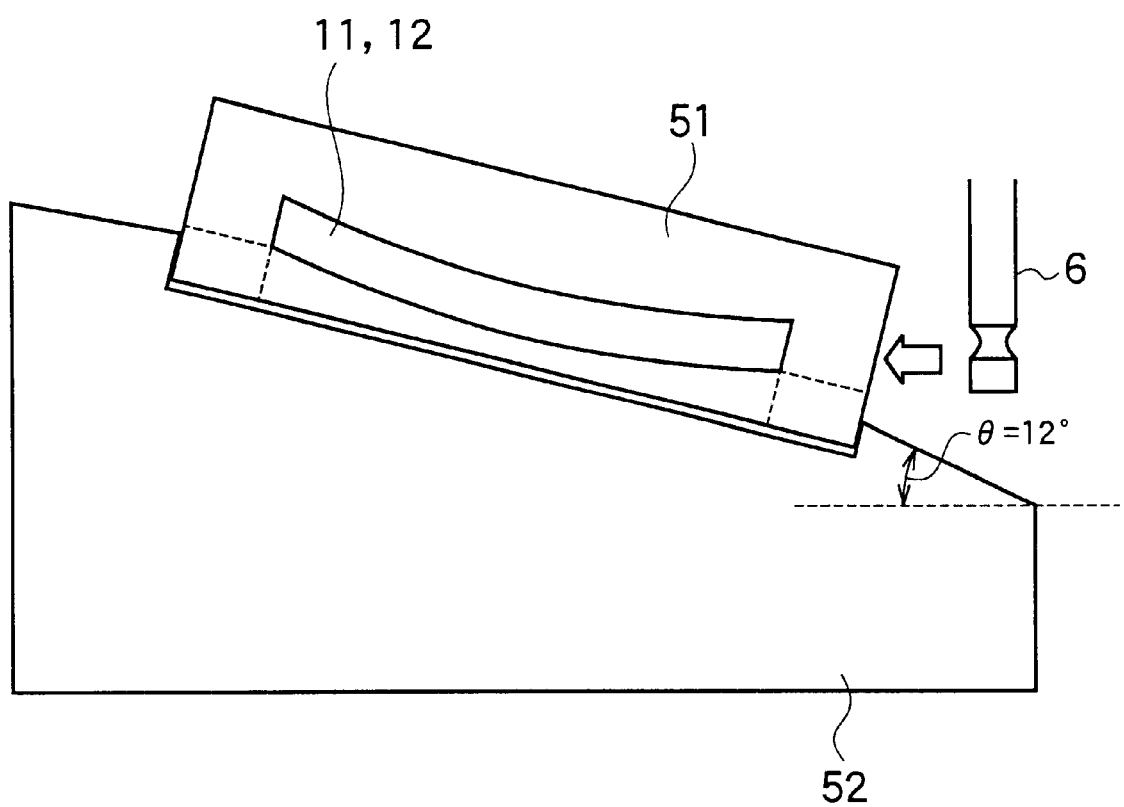
FIG. 8 is an explanatory diagram for a cutout machining method.

FIG. 8 is an explanatory diagram for an example of a machining method for the cutout 110. In FIG. 8, the symbol 51 is a form that secures the spectacle lens 11 or 12, while 52 is an angled holding pedestal that holds that form at some angle. In performing the machining, the lens 11 or 12 is inserted in the form 51 with the convex surface down, and the form 51 is secured on the angle holding pedestal 52. In the case of this embodiment, a 12-degree angle holding pedestal is used to match the average curve of the convex lens surface. In this condition, by cutting the lens horizontally while turning a cutter 6, a cutout 110 like that diagrammed in FIG. 1 can be formed.

Figure 9:
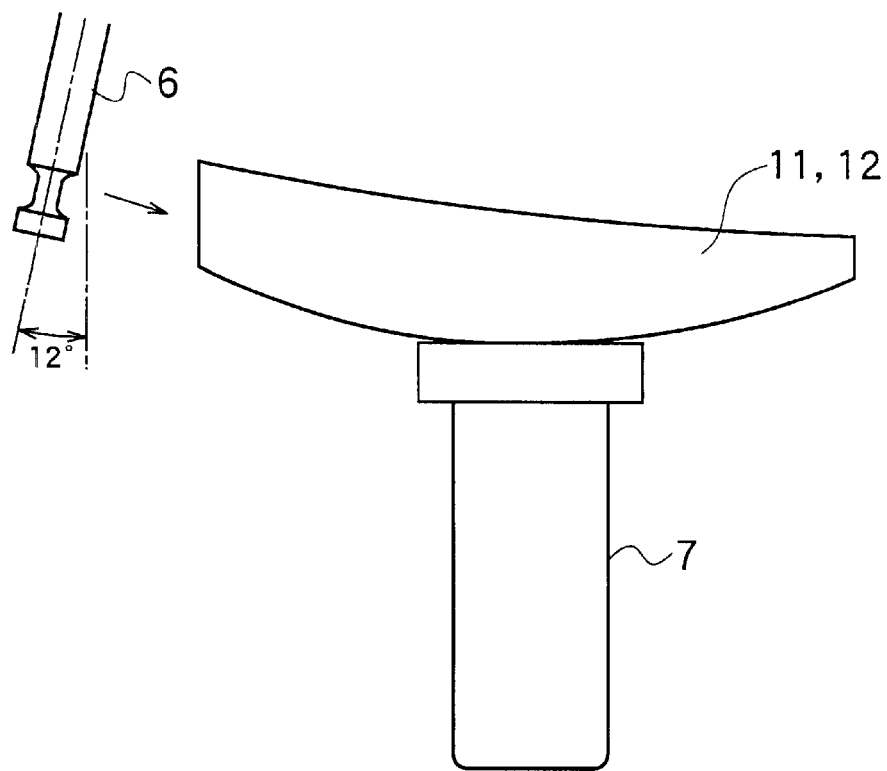
FIG. 9 is an explanatory diagram for a cutout machining method.
Figure 9:
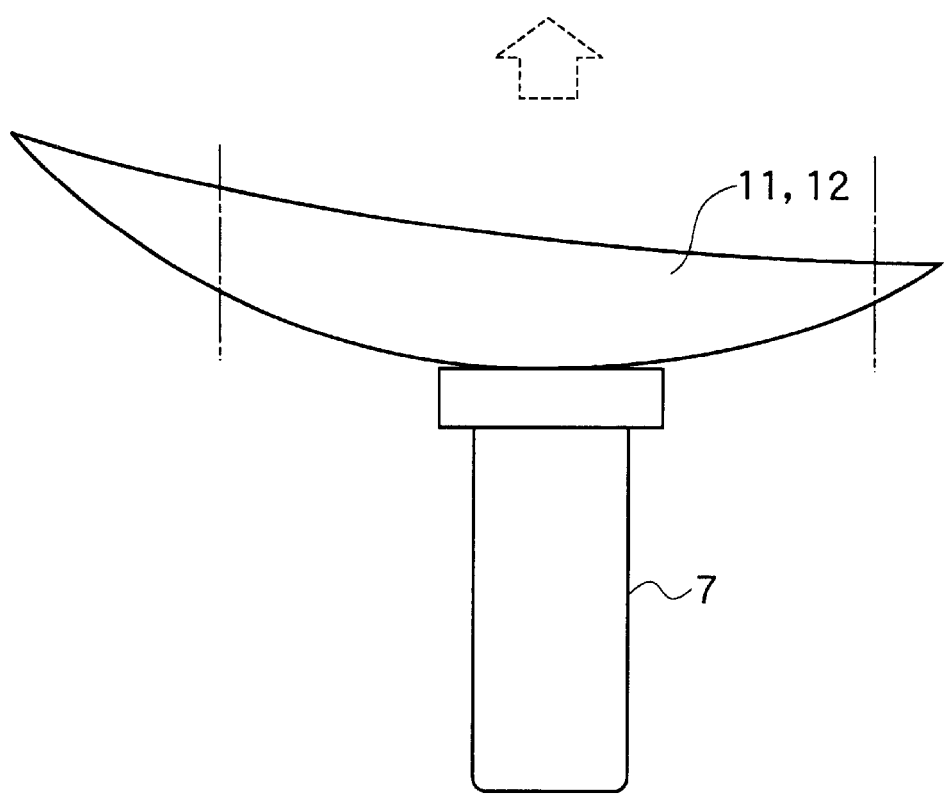

FIG. 9 is an explanatory diagram for a method of machining a lens wherein a block for machining the lens is chucked as it is without using a form or angle holding pedestal. This is a method of machining the lenses 11 and 12 by using a block 7, as is, that securely holds the lens in place for that purpose. That is, the block is chucked as is in an NC machining apparatus or the like and a cutter is brought to bear from a direction of 12 degrees. If this is done, it is extremely easy to automate the cutout machining.

Figure 10:
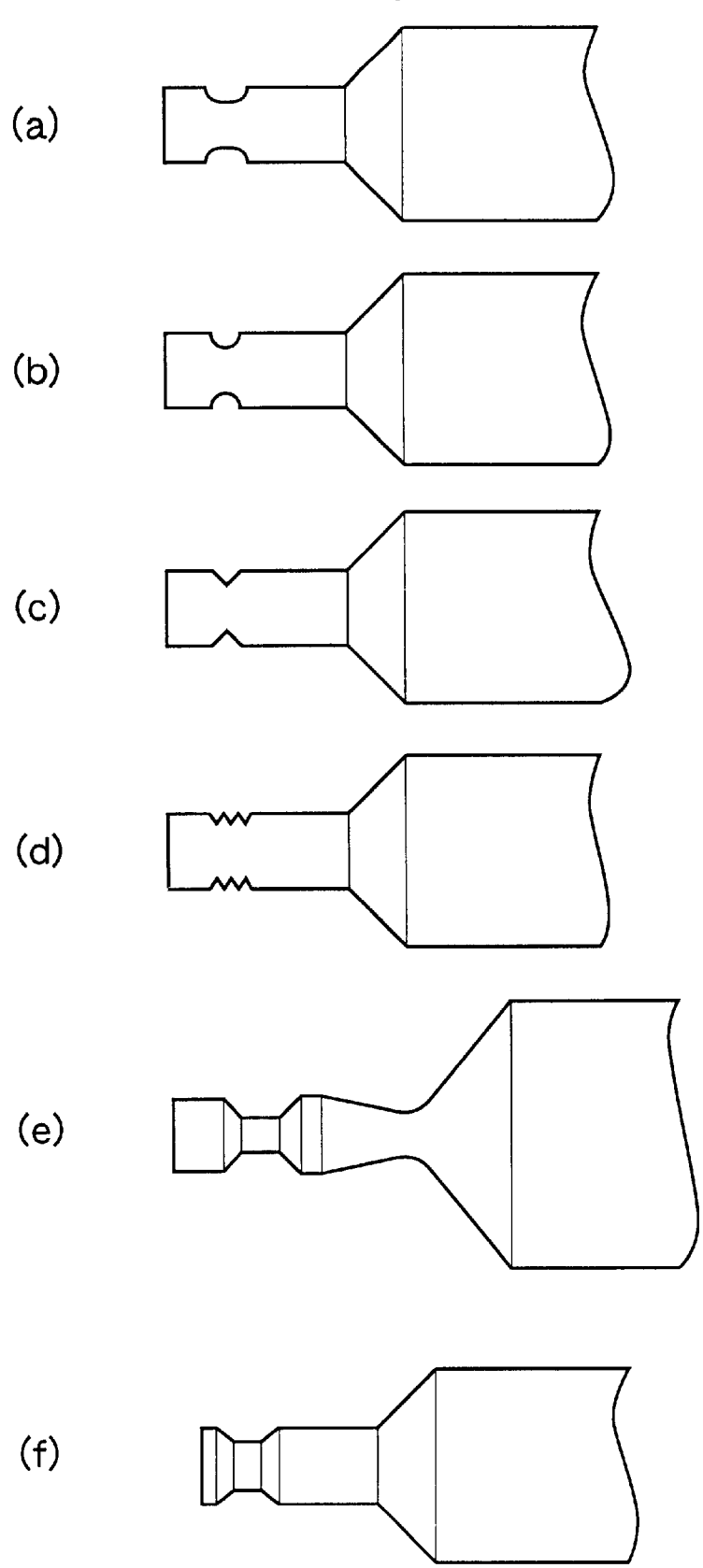
FIGS. 10a–10f provides diagrams of examples of cutters used when machining cutouts.
Figure 11:
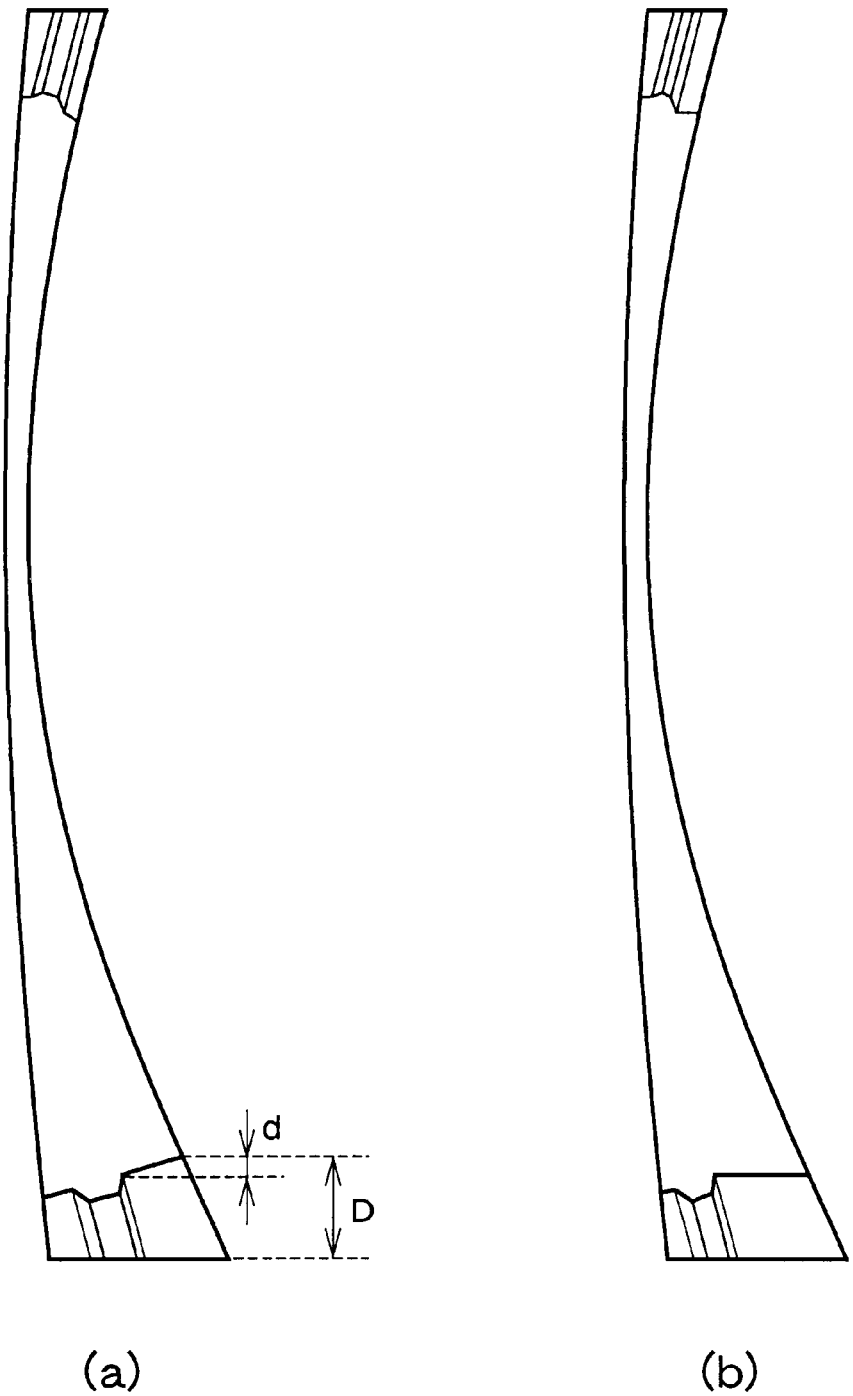
FIGS. 11a–11b provides diagrams of examples of cutout machining.
Figure 12:
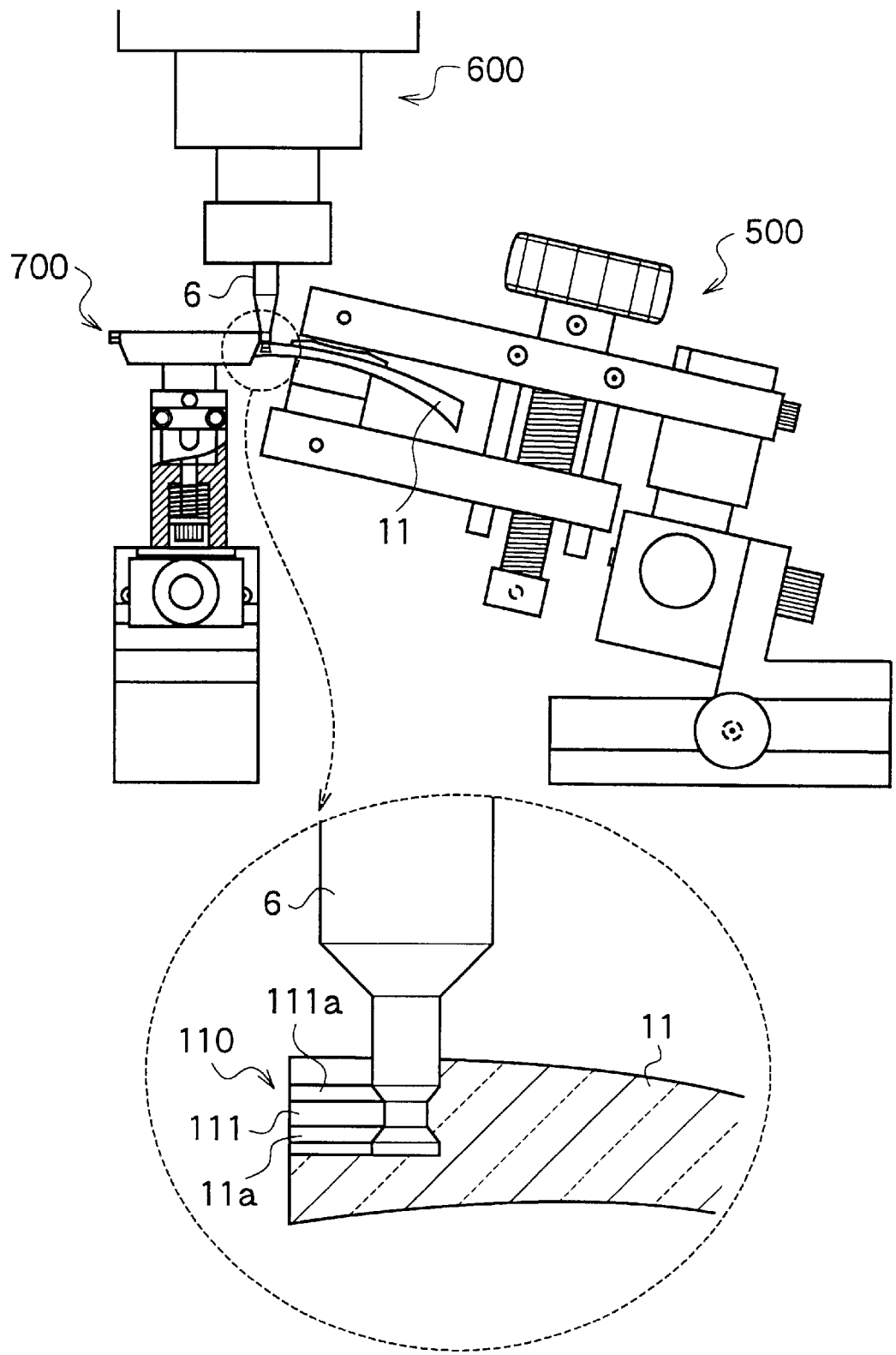
FIG. 12 is an explanatory diagram for another method of cutout machining.

FIG. 10 diagrams examples of cutters used when forming cutouts of various different shapes. Here, if machining is performed while tilting the cutters diagrammed in FIG. 10(a) to 10(d) 12°, when the lens periphery is thick (when the lens has a strong minus power), the back lens surface (on the eye side) will be greatly removed. As a result, not only will the lens strength be lowered, but the external appearance will be poor also because the cut will reflect when seen from the front. More specifically, FIG. 11(a) is a diagram which represents an example of cutout machining when the lens periphery is thick. As diagrammed in FIG. 11(a), the back lens surface side (side toward the eye) is removed by a distance D from the edge toward the center. Thereupon, when seen from the outside, the cut appears as a projected image toward the direction of observation. The size d thereof becomes approximately 0.8 millimeters in the case of this embodiment.

In cases such as this, the cutter diagrammed in FIG. 10(e) is used. This cutter is a cutter that has been out by the amount of the angle wherewith the lens is tilted (12 degrees in this embodiment). When machining is done with this cutter, as diagrammed in FIG. 11(b), cutout machining can be performed which parallels the lens edge surface, and strength and outward appearance are no longer impaired more than necessary.

When at least one or other of the front and the back surfaces of the spectacle lens 11 is machined in a closed shape, as in the example diagrammed in FIGS. 7(a) and 7(d), the cutter diagrammed in FIG. 10(f) is used. In this case, as diagrammed in FIG. 12, the spectacle lens 11 is secured in a spectacle lens securing apparatus 500 wherewith it can be positioned and secured. Then, positioning is done by a positioning reference plate 700 wherewith accurate positioning can be performed by pushing the edge of the spectacle lens 11 against the reference surface. Next, machining is performed by a cutter 6 attached to an NC machining apparatus 600.

Based on the embodiment described in the foregoing, the attachment member 31 is joined and secured by a ridge 111 provided in the cutout 110 and a groove 311 provided in the attachment member 31. Therefore, so long as there is sufficient thickness in the lens periphery for the ridge 111 to be formed by machining in the cutout 110, even a thin lens can be firmly secured. In addition, in the case of a thick lens, the cutout 110 can be made in a form wherein one surface side of the lens is closed, as diagrammed in FIGS. 7(a) and 7(d). Accordingly, firm securing can be done, regardless of whether the lens is thin or thick, while good design factors can also be maintained, wherefore the product value of the spectacle can be significantly enhanced.

Furthermore, because the ridge 111 in the cutout 110 is fit into the groove 311 provided in the attachment member 31, the joined portion thereof cannot be seen looking at the eyeglass frame from the front. Thus, even if the color of the adhesive changes over time, or there is any slight admixture of air bubbles in the joined portion, that will not be conspicuous.

In addition, because the fitted securing portion is machined integrally into the front end of the attachment member, it is possible to position the securing portion so that there is no sense of incongruity with the end pieces or bridge, and a natural outer appearance can be provided because no sharp pin-shaped projection comes in front of the eyes as with the PinFeel type.

Furthermore, although examples are given wherein an adhesive is used in securing the cutout 110 and the attachment member 31, it goes without saying that the securing may be done with only the tight fitting provided, without using an adhesive. Nevertheless, by adding an adhesive at the time of securing, the securing of the cutout and attachment member is made stronger. Also, it is presumed that the use of an adhesive will have a reinforcing effect against any microcracks (not visible to the naked eye) that develop during output machining, wherefore such use is to be preferred.

The adhesive used here may be an epoxy, acrylic, cyanoacrylate, or anaerobic type adhesive or the like. Epoxy adhesives, in particular, exhibiting outstanding adhesive effect irrespective of the lens material. The adhesive used should be a highly transparent adhesive of low viscosity, exhibiting a viscosity when used at 25° C. of 3000 poises or so. With a low-viscosity adhesive, there is little generation of air bubbles, and workability is outstanding. When an acrylic type lens is used for the spectacle lenses, furthermore, because such acrylic lenses are generally not highly resistant to solvents, it is preferable that an epoxy type adhesive be used.

In order to enhance the bonding strength, instead of making the groove provided in the attachment member a simple groove, the surface thereof may be roughened so that it is uneven, or portions of the groove may be made deeper to create reservoirs for the adhesive, and thus the adhesive strength can be dramatically increased.

Figure 13:
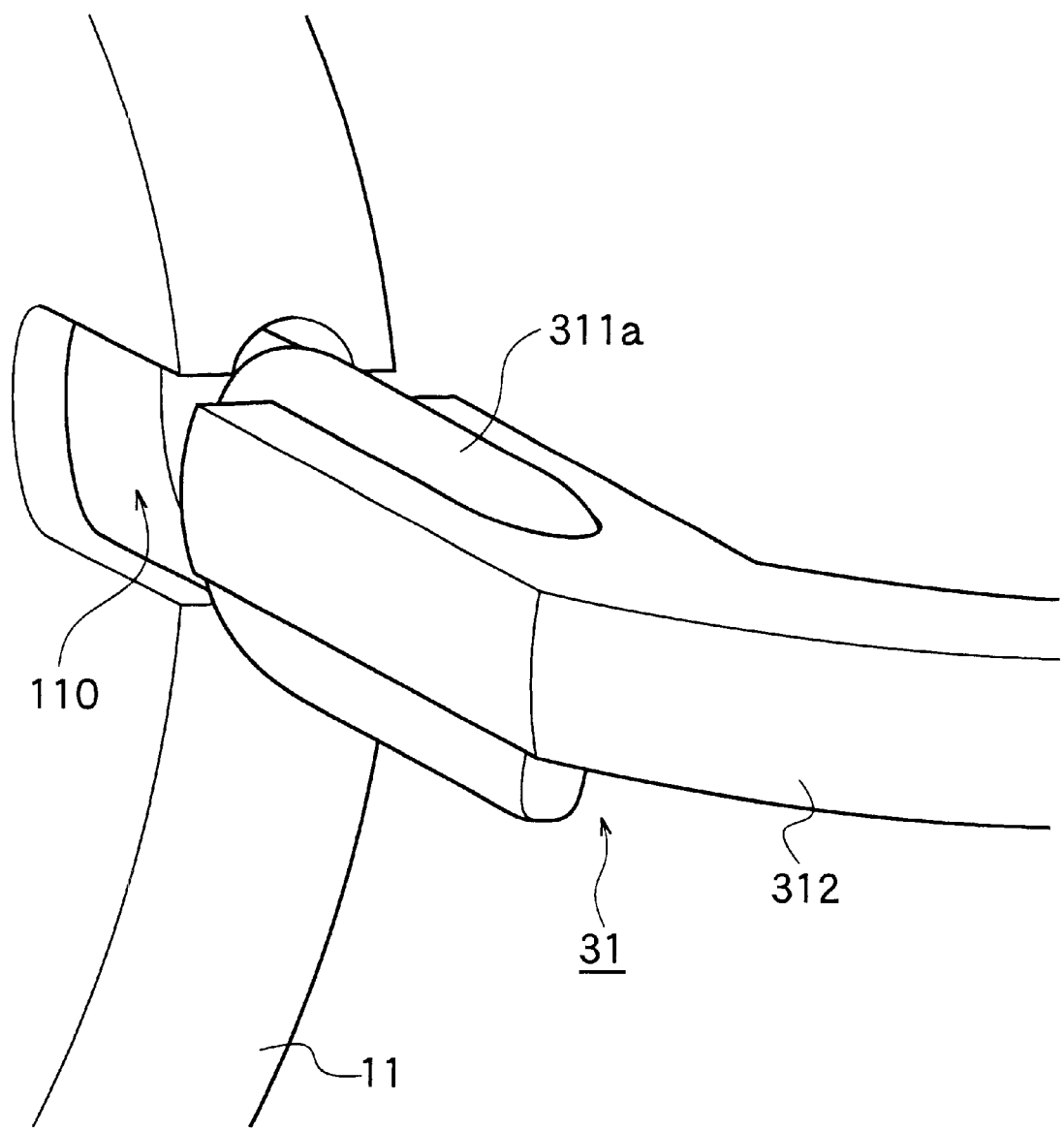
FIG. 13 is an explanatory diagram for the main parts of rimless spectacles relating to another embodiment of the present invention.

FIG. 13 is an explanatory diagram for the main parts of rimless spectacles relating to another embodiment of the present invention. In this embodiment, in opposite manner as in the embodiment described in the foregoing, a groove is provided in the cutout 110 and a ridge is provided in the attachment member 31. Otherwise the configuration is the same as in the embodiment described in the foregoing, wherefore no detailed description thereof is given here.

FIGS. 14 to 17 are diagrams representing still other embodiments. In the embodiments diagrammed in these figures, the attachment member used for the attachment member 31 is of a shape wherein the end piece 312 has been eliminated from the attachment member 31, a hinge structure is formed directly on this attachment member 31, and the temple is attached directly such that it can fold over. Based on these embodiments, as compared to conventional rimless spectacles having end pieces, it is possible to effect revolutionary new designs that are simple and abound in functional beauty.

Figure 14:
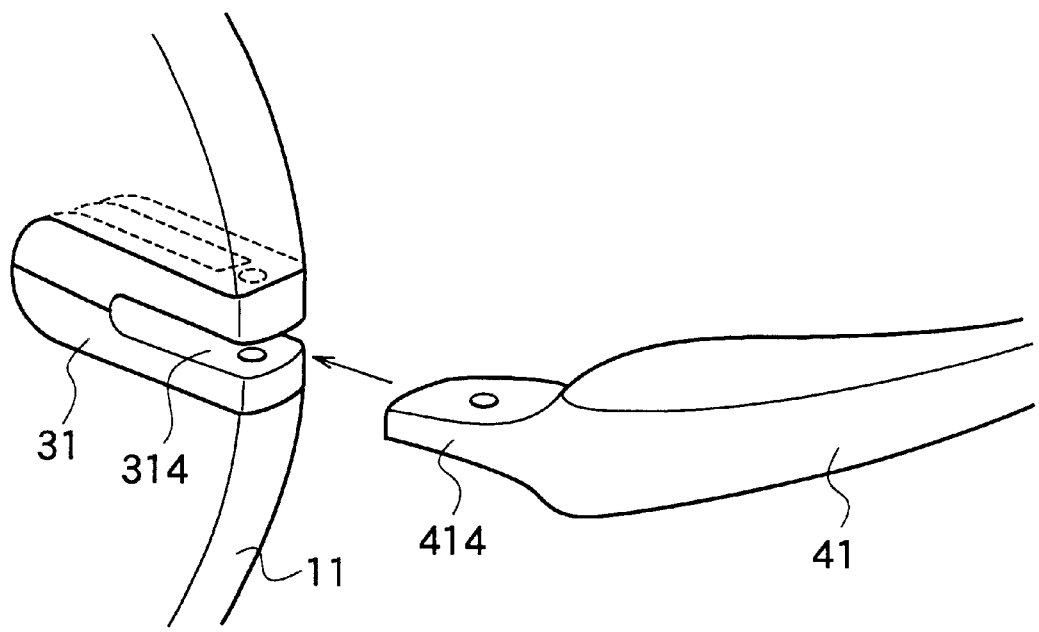
FIG. 14 is an explanatory diagram for the main parts of rimless spectacles relating to another embodiment of the present invention.

In the example diagrammed in FIG. 14, the attachment member 31 is formed in substantially the same size as the cutout 110, provision is made so that the entire attachment member 31 is accommodated inside the cutout 110, a hinge structure 314 is provided in the attachment member 31 that is pushed into place inside the cutout 110, a hinge coupling is effected with the hinge structure 414 provided at the front end of the temple 41, and the temple is attached directly so that it can be freely folded over.

Figure 15:
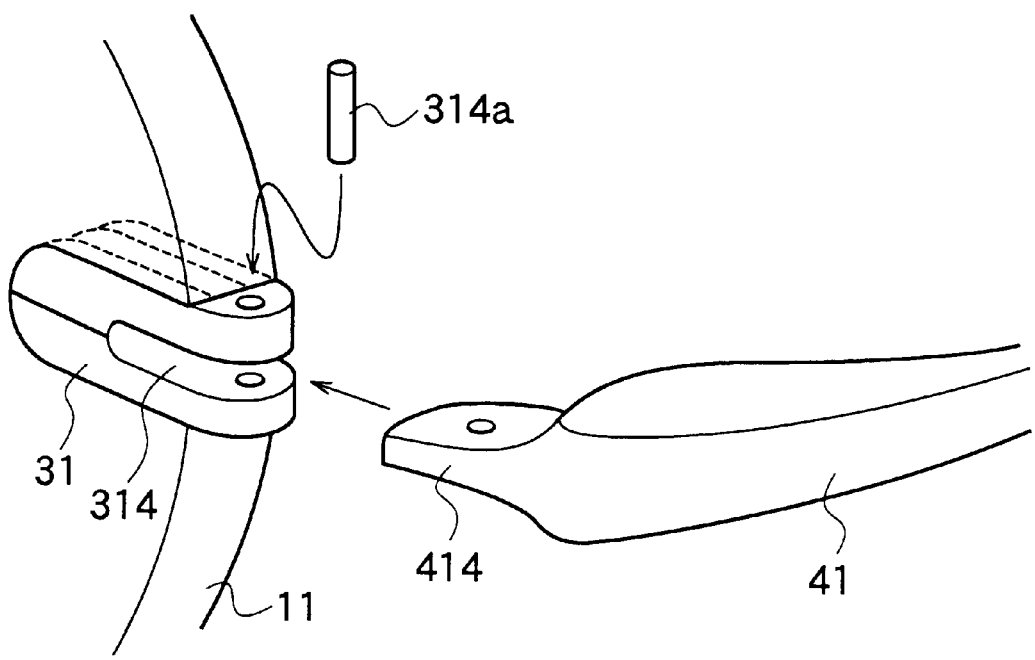
FIG. 15 is an explanatory diagram for the main parts of rimless spectacles relating to another embodiment of the present invention.

In the example diagrammed in FIG. 15, the attachment member 31 is formed so that the depth dimension thereof is slightly longer than the cutout 110, provision is made so that the back end of the attachment member 31 protrudes slightly from the edge of the spectacle lens, a hinge structure 314 is formed at that protruding place, a hinge coupling is effected with the hinge structure 414 provided in the front end of the temple 41, and the temple is attached with a screw 314a so that it can be folded over freely. When this is done, the screw 314a configuring the hinge structure can be adjusted at any time.

Figure 16:
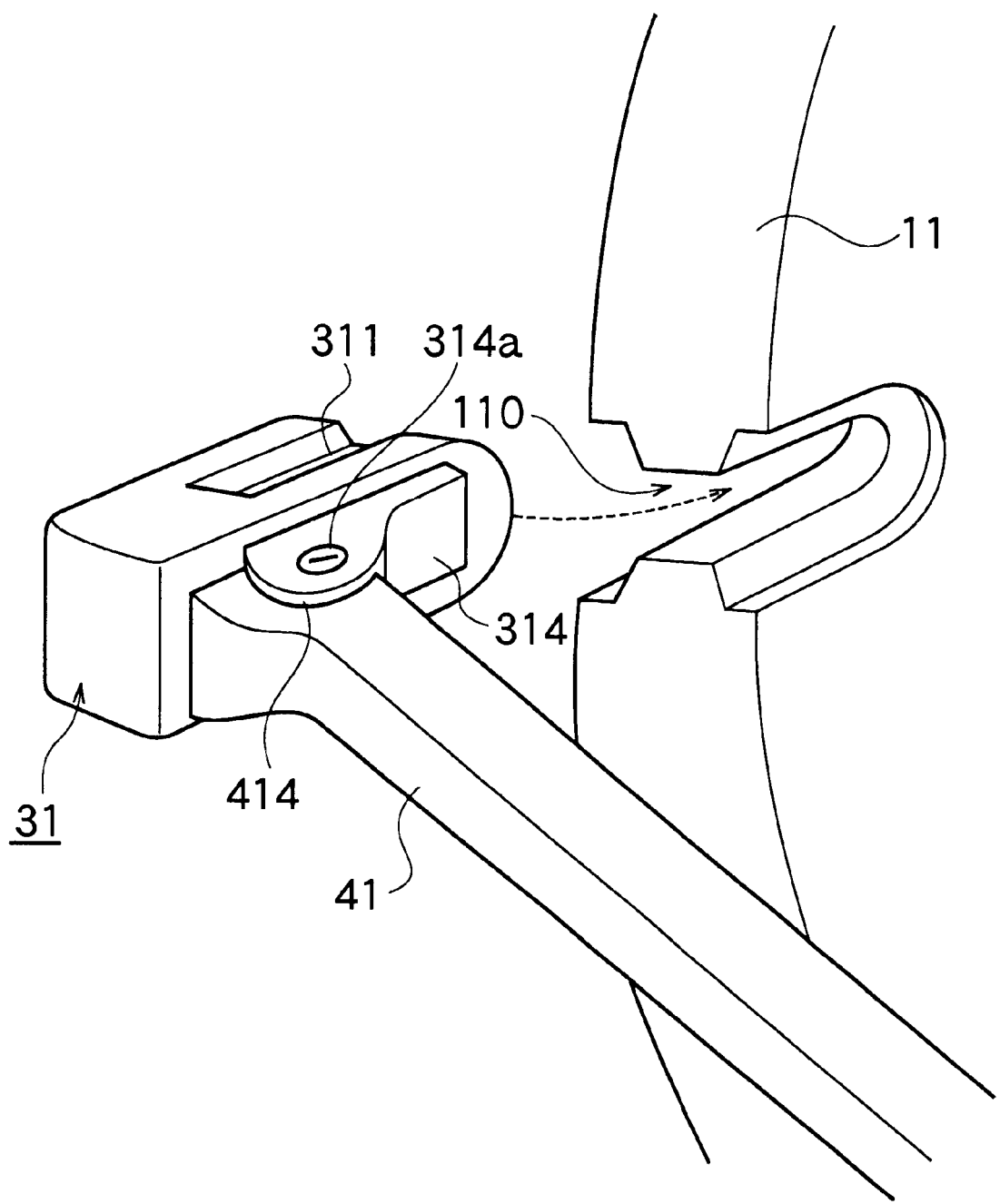
FIG. 16 is an explanatory diagram for the main parts of rimless spectacles relating to another embodiment of the present invention.
Figure 17:
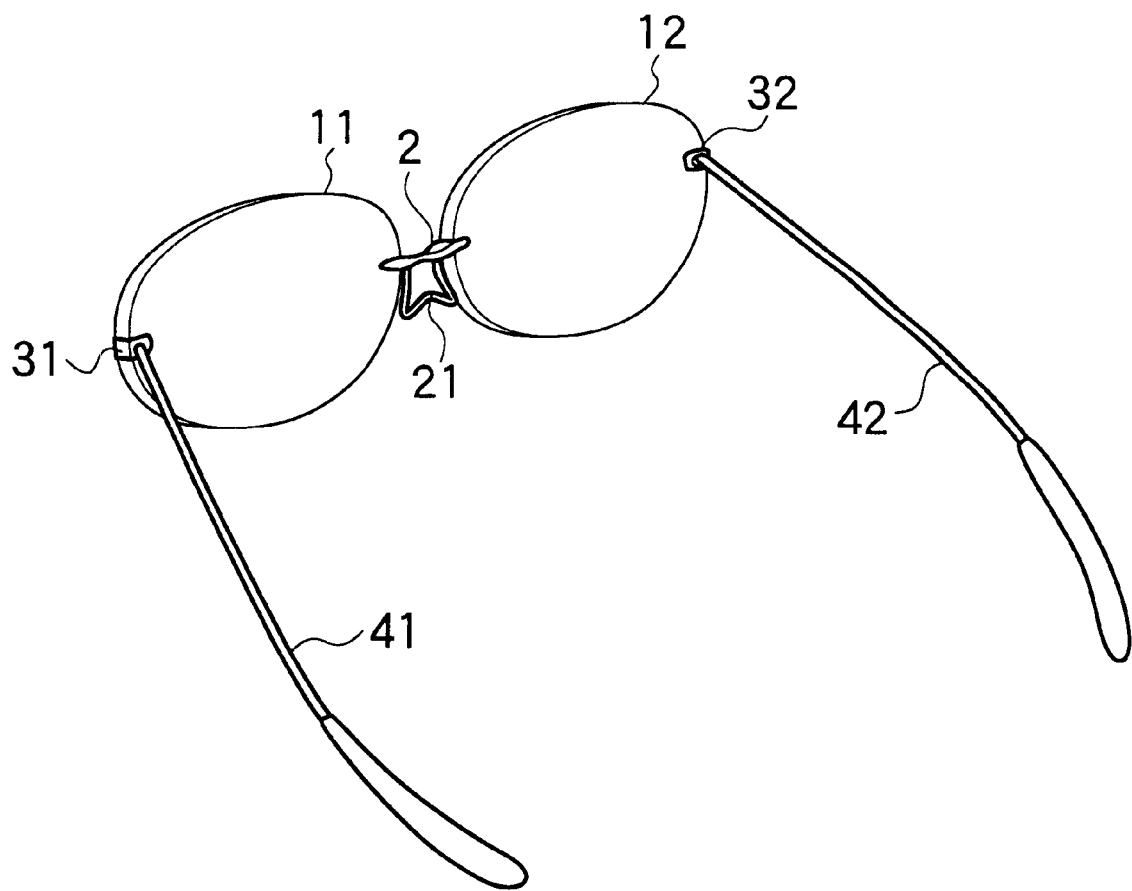
FIG. 17 is an oblique view of rimless spectacles relating to another embodiment of the present invention.

In the example diagrammed in FIG. 16, the attachment member 31 is formed in substantially the same size as the cutout 110, provision is made so that the entire attachment member 31 is accommodated inside the cutout 110, a hinge structure 314 is provided on the side of the cutout 110 toward the eye, a hinge coupling is effected with the hinge structure 414 provided in the front end of the temple 41, and the temple is attached so that it can be folded over freely. Based on this, it is easy to make it so that the end piece and hinge structure cannot be seen at all from the front. Also, even when the lens edge thickness is thick (in a case like that diagrammed in FIG. 6(c)), by lengthening the hinge structure 414 on the face side, the screw 314a of the hinge structure is brought out to the outside, and a structure can be effected that is adjustable at any time.

According to the embodiments described in the foregoing, when the attachment member is pushed into place in the cutout, the groove or ridge provided in the attachment member is mated with the ridge or groove provided in the cutout and secured, wherefore not only is strong securing made possible, but the following benefits are realized.

(1) There is very little possibility of loosening after attachment compared to when securing is done using screws or the like.

(2) Large securing contact surfaces (bonding surfaces) can be obtained, wherefore firm attachment can be maintained. At the same time, the size of the attachment members can be made substantially about the same as the size of the cutouts. Also, because it is possible to make the attachment members flat with the lens surfaces without protruding from the lens surfaces, the aesthetic benefit gained is enormous, and the operation of wiping the lens surfaces is made very easy.

(3) The size of the attachment members can be made small, wherefore a wide effective field of view can be obtained.

(4) The cutout has either the same width or a width that gradually diminishes from the lens edge, wherefore machining is simple and automation is also easy.

(5) It is only necessary to realize a structure wherewith grooves or ridges provided in attachment members can be pushed into place about or into ridges or grooves provided in cutouts, wherefore there is little influence from the thickness of the lenses, and the material thickness at the lens periphery can be made thin or thick without any problem whatever. Accordingly, Ophthalmic use of the spectacles is extremely easy.

(6) It is easy to make the attachment structure portion inconspicuous, and there is no sense of incongruity in terms of design.

(7) A hinge can be deployed directly on the attachment member, without providing an end piece, and the temple can be attached directly so that it can be folded over. Thus it is possible to effect new and extremely revolutionary designs never seen before.

(8) Given the securing structure, firm attachment is possible using various kinds of materials, so the material is not limited.

INDUSTRIAL APPLICABILITY

The present invention, as described in detail in the foregoing, provides rimless spectacles wherein cutouts are provided in the edges of spectacle lenses and attachment members are pushed into place in those cutouts and attached. The cutouts have widths that are either substantially constant or gradually narrow from the edge of the lens toward the center thereof, with ridges or grooves substantially parallel to the front and back surfaces of the spectacle lenses formed in the inner circumferential wall parts thereof. The attachment members have grooves or ridges formed therein that, when those attachment members are inserted into the cutouts from the edge sides of the spectacle lenses and pushed into place, mate with ridges or grooves in the cutouts where the attachment members abut on the inner circumferential wall parts of the cutouts. Thus the rimless spectacles of the present invention are characterized in that the attachment members are attached by being inserted from the edge sides of the spectacle lenses into the cutouts and pushed into place therein. Rimless spectacles are therefore obtained wherewith simple, definite, and firm attachment is possible, breadth of effective field of view, durability, aesthetic beauty, and lighter weight, etc., are readily secured, and fabrication is easy.

What is claimed is:

1. A lens holding mechanism for spectacles comprising:

a cutout portion formed in edges of spectacle lenses by cutting out the edges;

a push-into portion which is provided on a lens holding member holding said spectacle lenses, and is pushed into said cutout portion by being inserted into said cutout portion from an edges side of said spectacle lenses when said spectacle lenses are held by said lens holding member;

a groove portion formed nearly parallel to lens surfaces of said spectacle lenses in a contact portion of said cutout portion and said push-into portion which is pushed into said cutout portion; and a ridge portion which is formed nearly parallel to said lens surfaces of said spectacle lenses in the contact portion of said cutout portion and said push-into portion which is pushed into said cutout portion, and is pushed into said groove portion by being inserted into said groove portion when said push-into portion is inserted into said cutout portion.

2. The lens holding mechanism for spectacles according to claim 1, wherein said groove portion is formed in said push-into portion, and said ridge portion is formed in said cutout portion.

3. The lens holding mechanism for spectacles according to claim 1, wherein said groove portion is formed in said cutout portion, and said ridge portion is formed in said push-into portion.

4. The lens holding mechanism for spectacles according to claim 1, wherein a width of said cutout portion in a direction nearly perpendicular to both a direction of a thickness of said spectacle lenses and a cutout direction of said cutout portion is set nearly constant.

5. The lens holding mechanism for spectacles according to claim 1, wherein a width of said cutout portion in a direction nearly perpendicular to both a direction of a thickness of said spectacle lenses and a cutout direction of said cutout portion is set so that the width becomes gradually narrower to said cutout direction of said cutout portion.

6. The lens holding mechanism for spectacles according to claim 1, wherein a width of said push-into portion in a direction of a thickness of said spectacle lenses is set nearly equal to the width of said cutout portion in the direction of the thickness.

7. The lens holding mechanism for spectacles according to claim 1, wherein a width of said push-into portion in a direction of a thickness of said spectacle lenses is set thinner than a width of said cutout portion in the direction of the thickness.

8. The lens holding mechanism for spectacles according to claim 1, wherein said push-into portion is positioned nearly in a center of said cutout portion in a direction of a thickness of said spectacle lenses.

9. The lens holding mechanism for spectacles according to claim 1, wherein said push-into portion is positioned in a position deviated towards a direction of a thickness of said spectacle lenses from the center of said cutout portion in the direction of the thickness of said spectacle lenses.

10. The lens holding mechanism for spectacles according to claim 1, wherein said cutout portion has two sides corresponding to a front side lens surface and a back side lens surface of said spectacle lenses, and at least one side of said two sides is closed.

11. The lens holding mechanism for spectacles according to claim 1, wherein said push-into portion is fixed to said cutout portion with adhesives.

12. The lens holding mechanism for spectacles according to claim 1, wherein said lens holding member is an end-piece of said spectacles.

13. The lens holding mechanism for spectacles according to claim 12, wherein said end-piece is set to become larger than said cutout portion.

14. The lens holding mechanism for spectacles according to claim 13, wherein a temple of said spectacles is attached to a portion other than said push-into portion of said end-piece so that said temple can be folded over freely.

15. The lens holding mechanism for spectacles according to claim 13, wherein said end-piece has a protrusion portion protruding from the edges of said spectacle lenses, and a temple of said spectacles is attached to said protrusion portion so that said temple can be folded over freely.

16. The lens holding mechanism for spectacles according to claim 12, wherein said end-piece is set as nearly a same size as said cutout portion.

17. The lens holding mechanism for spectacles according to claim 16, wherein a temple of said spectacles is attached to said end-piece inside said cutout portion so that said temple can be folded over freely.

18. The lens holding mechanism for spectacles according to claim 15, wherein said push-into portion has a side corresponding to a back side lens surface of said spectacle lenses, and a temple of said spectacles is attached to said side so that said temple can be folded over freely.

19. The lens holding mechanism for spectacles according to claim 1, wherein said lens holding member is a bridge of said spectacles.

* * * * *

UNITED STATES PATENT AND TRADEMARK OFFICE
CERTIFICATE OF CORRECTION

PATENT NO.     : 6,540,350 B2  Page 1 of 1
DATED          : April 1, 2003
INVENTOR(S)    : Hakaru Fujita It is certified that error appears in the above-identified patent and that said Letters Patent is hereby corrected as shown below:

Title page,
Item [30], Foreign Application Priority Data, should further include
-- April 13, 2001  (JP) ........................ 2001-115338 --.

Signed and Sealed this

Twelfth Day of August, 2003

JAMES E. ROGAN
*Director of the United States Patent and Trademark Office*